United States Patent [19]
Chen

[11] Patent Number: 5,684,883
[45] Date of Patent: Nov. 4, 1997

[54] DEVICE FOR RECEIVING EARPHONE/ MICROPHONE WIRE OF HOLDFREE HAND SET

[75] Inventor: Tonny Chen, Changhua, Taiwan

[73] Assignee: E Lead Electronic Co., Ltd., Changhua, Taiwan

[21] Appl. No.: 756,554

[22] Filed: Nov. 26, 1996

[51] Int. Cl.$^6$ ................................................ H04R 25/00
[52] U.S. Cl. .......................... 381/187; 381/183; 439/501
[58] Field of Search .................... 381/187, 183, 381/169, 25; 439/501, 12, 13, 18, 20, 22, 24, 27; 181/129, 130, 135; 379/438, 430; 455/351

[56] References Cited

U.S. PATENT DOCUMENTS

| | | | |
|---|---|---|---|
| 4,942,617 | 7/1990 | Boylan | 381/187 |
| 5,339,461 | 8/1994 | Loplow | 455/351 |
| 5,422,957 | 6/1995 | Cummins | 381/187 |
| 5,511,120 | 4/1996 | Hirath et al. | 379/433 |
| 5,581,821 | 12/1996 | Nakano | 2/422 |

*Primary Examiner*—Sinh Tran
*Attorney, Agent, or Firm*—Bacon & Thomas

[57] ABSTRACT

A device for receiving earphone/microphone wire of holdfree hand set, including a housing, a winding set and an earphone/microphone wire. The winding set is received in the housing. The winding set includes a lower reel and an upper reel for winding the earphone/microphone wire thereon without tangling or missing.

5 Claims, 10 Drawing Sheets

DEVICE FOR RECEIVING EARPHONE/ MICROPHONE WIRE OF HOLDFREE HAND SET

BACKGROUND OF THE INVENTION

The present invention relates to a device for receiving earphone/microphone wire of holdfree hand set. The device includes a winding set for winding the earphone/microphone wire thereon without tangling or missing.

Figure 1:
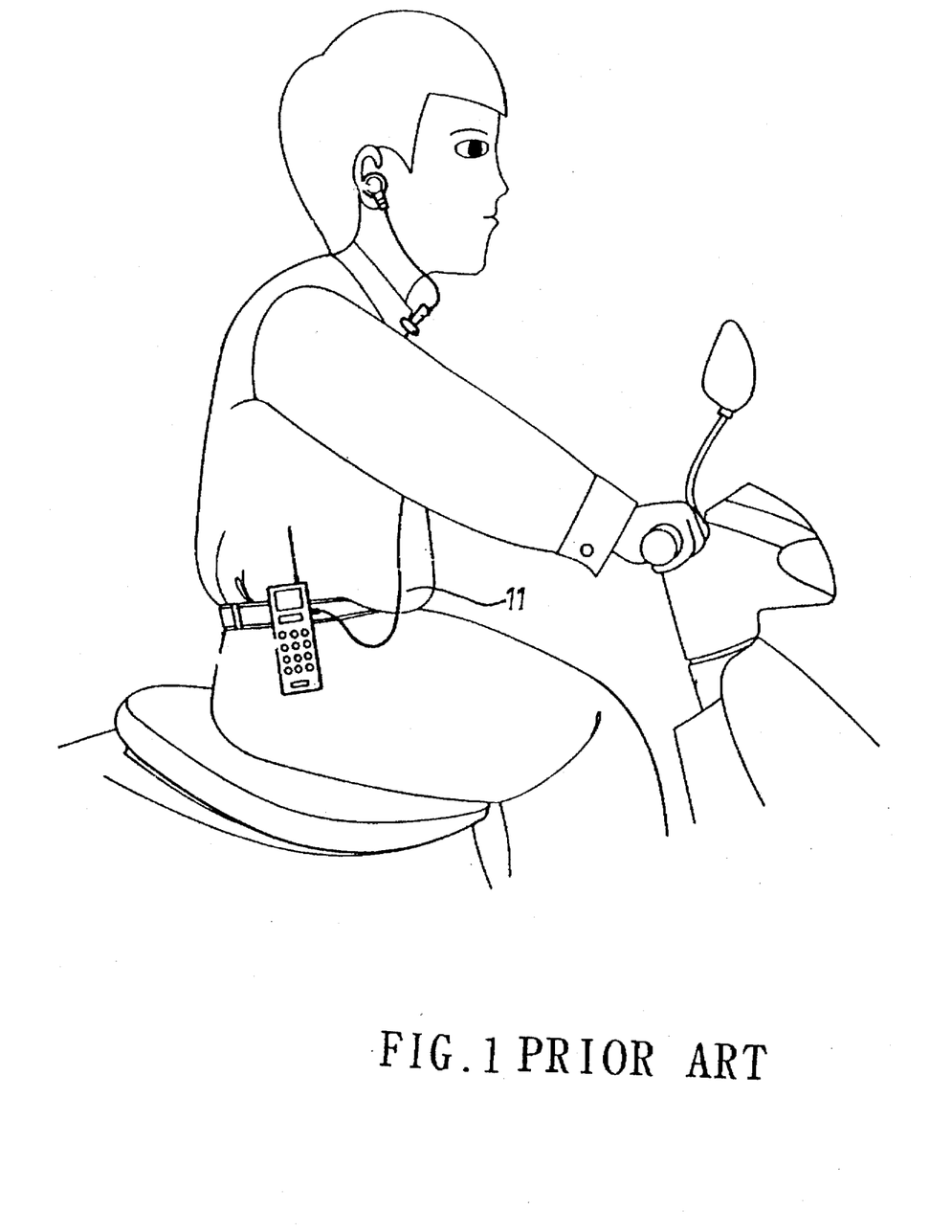
FIG. 1 shows the application of the holdfree hand set and the use of the earphone/microphone wire thereof.

The holdfree function of a mobile phone has been more and more widely applied, especially during walking, working or driving a car. The holdfree function not only ensures a good communication, but also ensures the safety of the user in using the mobile phone. However, as shown in FIG. 1, the earphone/microphone wire 11 of the conventional holdfree hand set has a considerably long length. When not used, such wire cannot be wound and taken in. This often leads to inconvenience to the user when moving and the wire is apt to tangle with itself.

SUMMARY OF THE INVENTION

It is therefore a primary object of the present invention to provide a device for receiving earphone/microphone wire of holdfree hand set. The device includes a winding set for winding the earphone/microphone wire thereon without tangling or missing.

The present invention can be best understood through the following description and accompanying drawings, wherein:

DETAILED DESCRIPTION OF THE PREFERRED EMBODIMENTS

Figure 2:
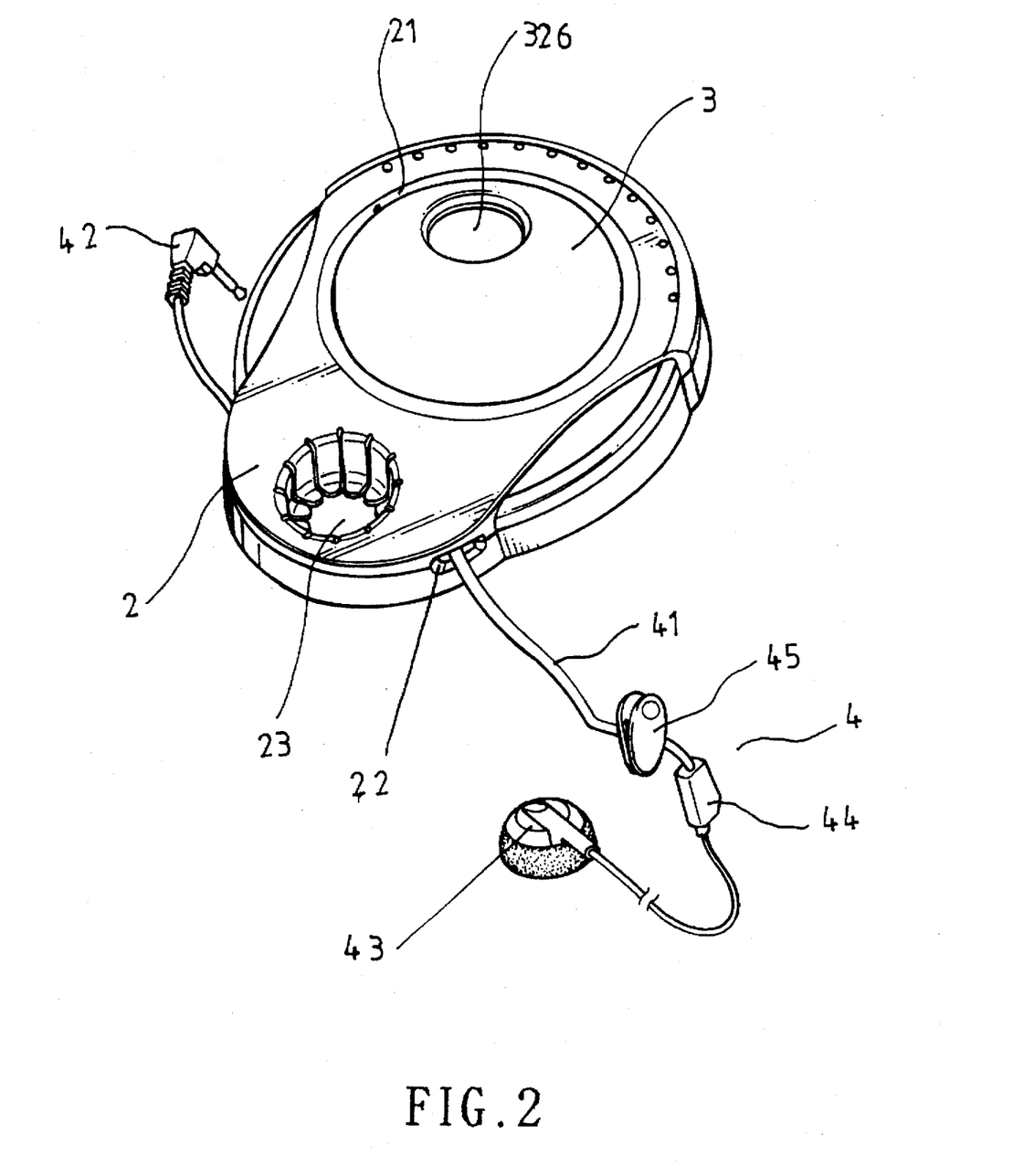
FIG. 2 is a perspective assembled view of the present invention.
Figure 3:
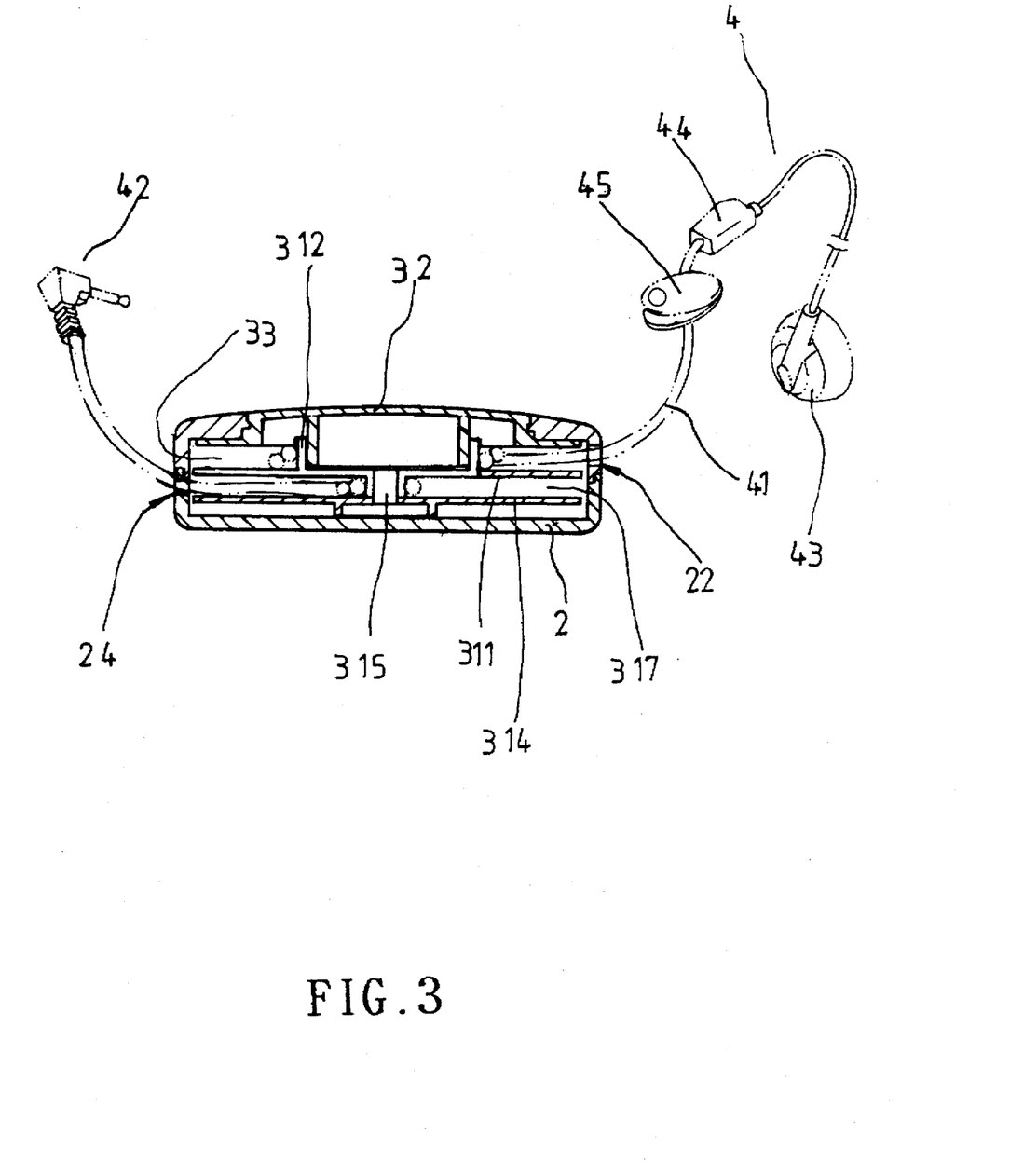
FIG. 3 is a sectional view of the present invention.
Figure 4:
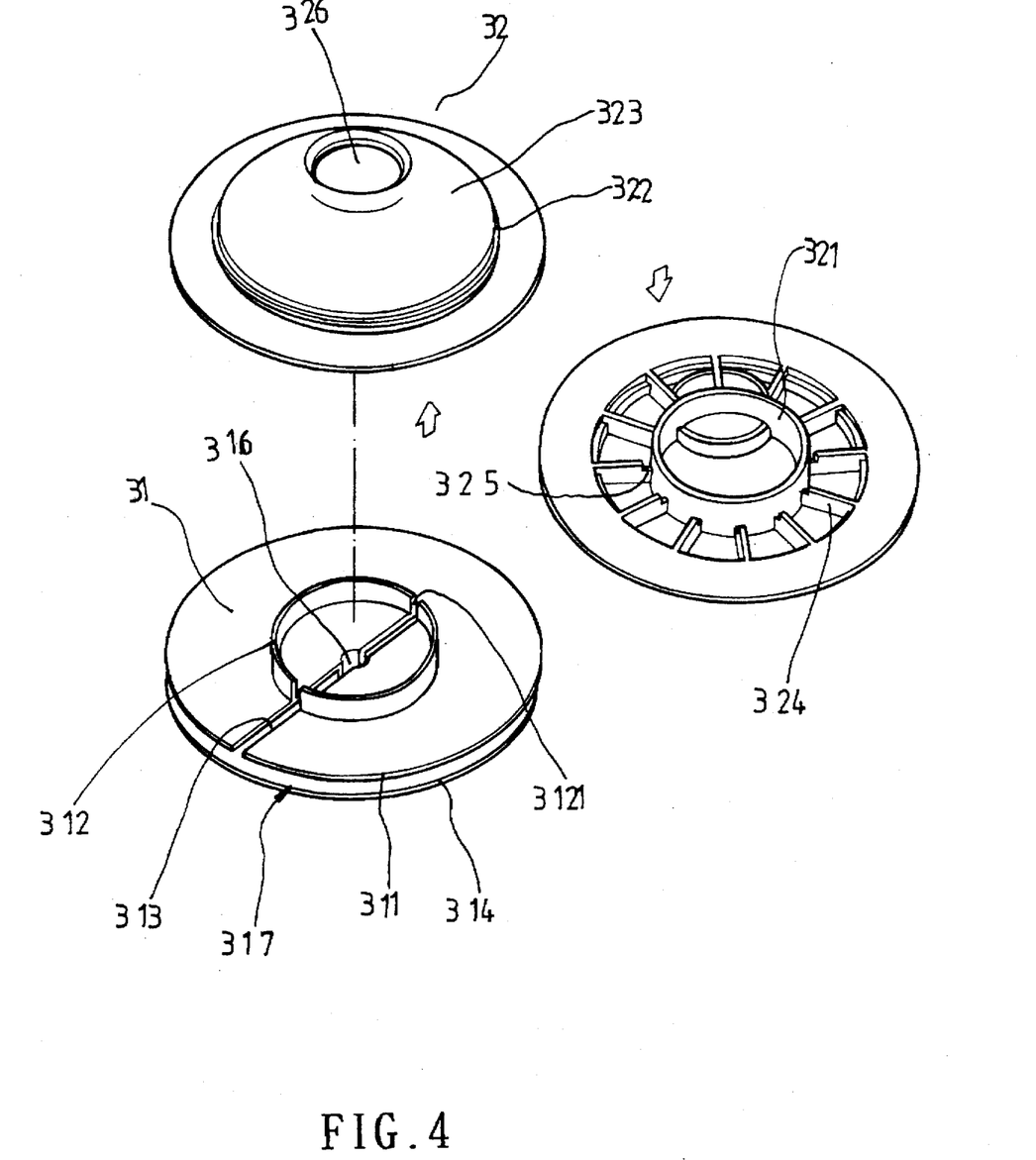
FIG. 4 is a perspective exploded view of the winding set of the present invention.

Please refer to FIGS. 2, 3 and 4. The present invention includes a housing 2, a winding set 3 and an earphone/microphone wire 4.

The winding set 3 is received in the housing 2. The top face of the housing 2 is formed with a circular hole 21 and an earphone receptacle 23. In addition, the edge of the housing 2 is disposed with a plus lead hole 24 and an earphone lead hole 22.

The winding set 3 is received in the housing 2, including a lower reel 31 and an upper reel 32. The lower reel 31 is composed of an upper and a lower disks 311,314. The center of the face off the upper disk 311 is disposed with an annular rib 312. The bottom of the upper reel 32 is disposed with several radial ribs 324. The inner ends of the radial ribs 324 are formed with recesses 325, whereby the annular rib 312 of the upper disk 311 is fitted into the recesses 325 of the radial ribs 324 of the upper reel 32 so as to assemble the upper reel 32 with the lower reel 31 and define a clearance 33 therebetween for winding and storing the earphone/microphone wire 4 therein. A cut channel 313 extends from a point of the annular rib 312 through the center of the upper disk 311 to the periphery thereof. The upper disk 311 is formed with a central hollow shaft 315 defining a shaft hole 316 on the cut channel 313. The upper and lower disks 311,314 define a clearance 317 for winding and receiving the earphone/microphone wire 4 therein. The center of the bottom of the upper reel 32 is disposed with an annular rib 321. The radial ribs 324 are arranged around the annular rib 312. The recess 325 is disposed at the adjoining portion between the annular rib 321 and the radial rib 324. The top face of the upper reel 32 is formed with a central convex portion 323. At least one flange 322 is disposed along the periphery of the upper reel 32 for locating the upper reel 32 in the housing 2. A driving hole 326 is formed on one side of the central convex portion 323 for a finger to rotarily drive the upper reel.

The earphone/microphone wire 4 includes a wire body 41 received in the winding set 3. Two ends of the wire body are respectively conducted out from the lead holes 22, 24. One end of the wire body is disposed with a plug 42, while the other end thereof is disposed with an earphone 43, a microphone 44 and a clip 45.

Figure 5:
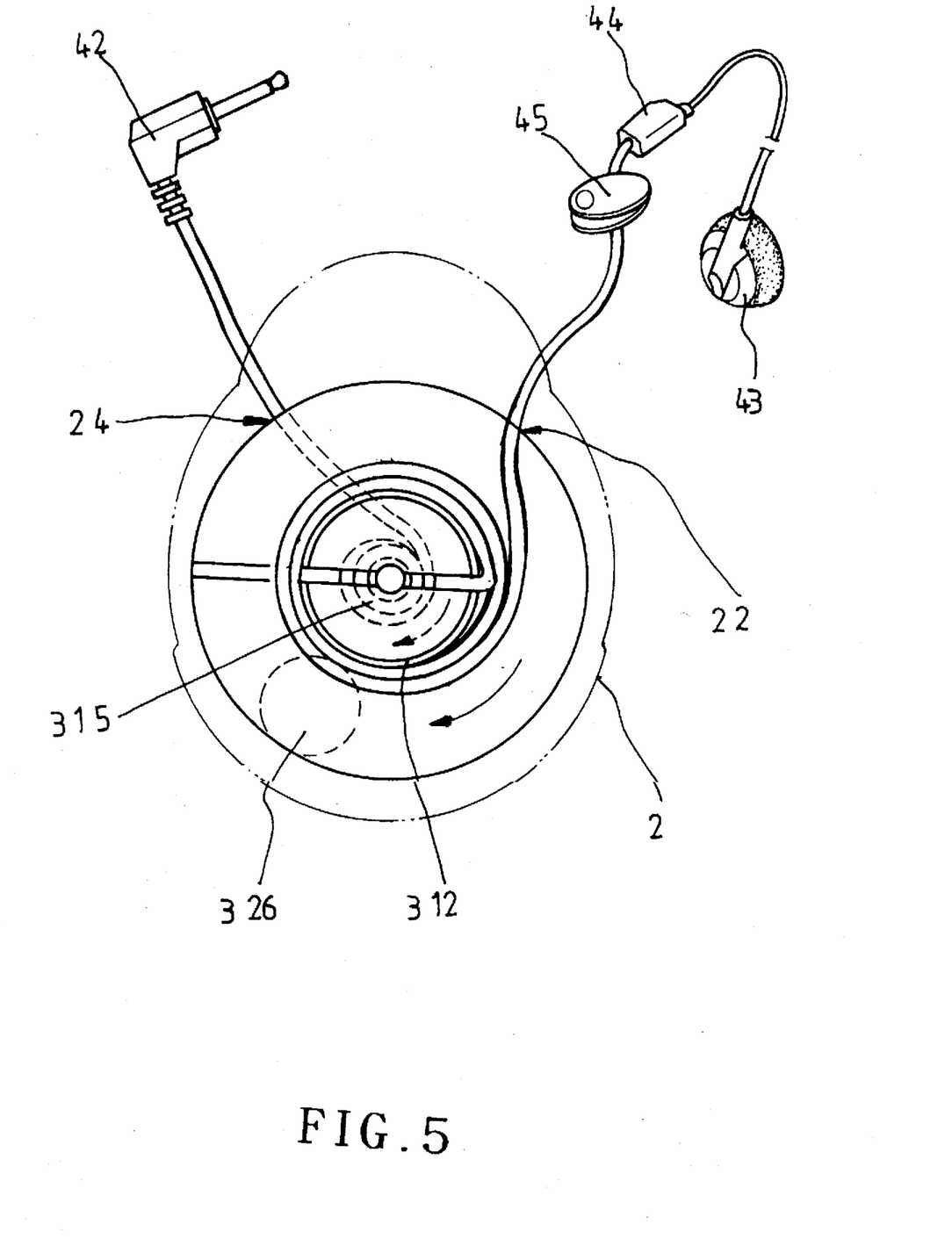
FIG. 5 shows the operation of the present invention.

Referring to FIGS. 4 and 5, the earphone/microphone wire 4 is received in the winding set 3 in such a manner that a portion of the wire body 41 near the plug 42 is fitted into the cut channel 313 of the lower reel 31 and wound about the hollow shaft 315 within the clearance 317 between the upper and lower disks 311, 314 and then passed outward through the plug lead hole 24. On the other hand, the wire body 41 near the earphone is conducted through the cut 3121 of the annular rib 312 to be wound around the annular rib 312 and then conducted out from the earphone lead hole 22. A suitable and sufficient length of wire body 41 wound between the hollow shaft 315 and the annular rib 312 remains to be fixed at a point (not shown), whereby when pulling out or taking in the wire bodies 41, the wire bodies 41 are prevented from intervening with each other. The diameter of the hollow shaft 315 is much smaller than the outer diameter of the annular rib 312 so that when it is desired to wind the wire body 41 after communication, the user can extend his finger into the driving hole 326 to rotate the upper reel 32. At this time, the lower reel 31 is driven to simultaneously wind in the wire bodies 41 of the plug and earphone. The great difference of diameter between the annular rib 312 and the hollow shaft 315 results in that the displacement of the wire body of the earphone is much larger than the displacement of the plug. (This is because the earphone necessitates longer length, while the plug necessitates shorter length, whereby the two ends can be synchronously wound in and located.

Figure 6:
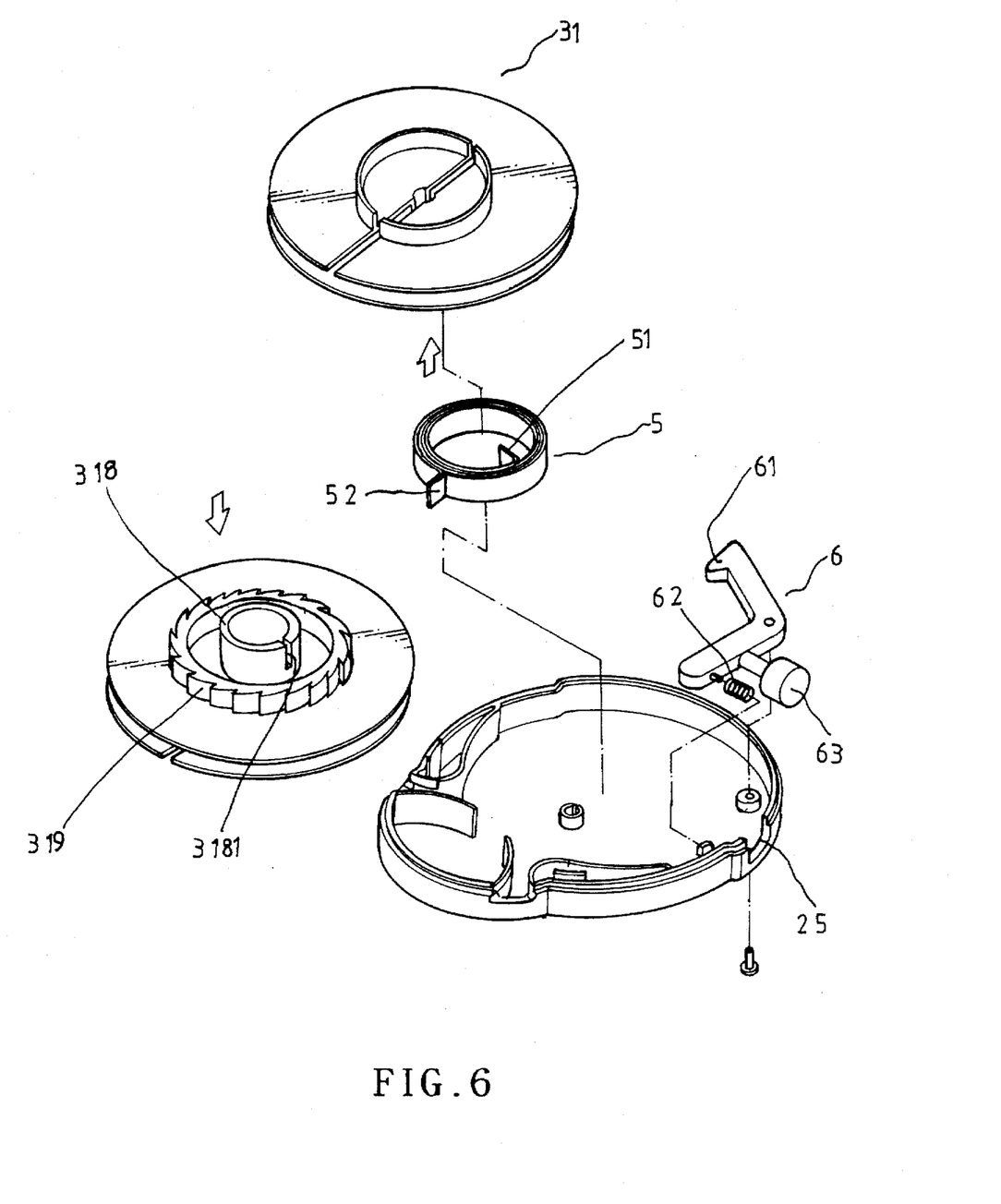
FIG. 6 is a perspective exploded view of another embodiment of the winding set of the present invention.
Figure 7:
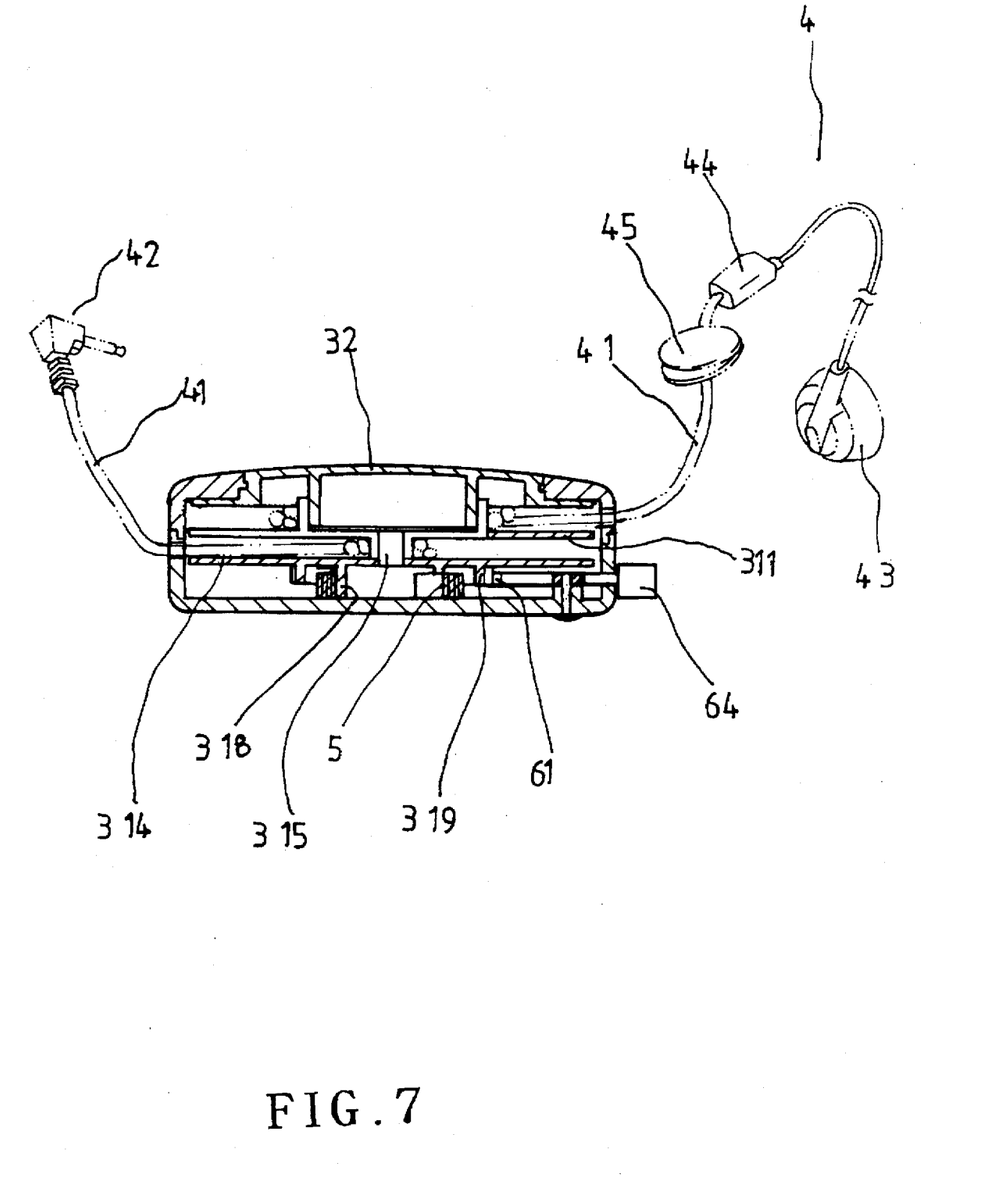
FIG. 7 is a sectional view of the embodiment of FIG. 6.
Figure 8:
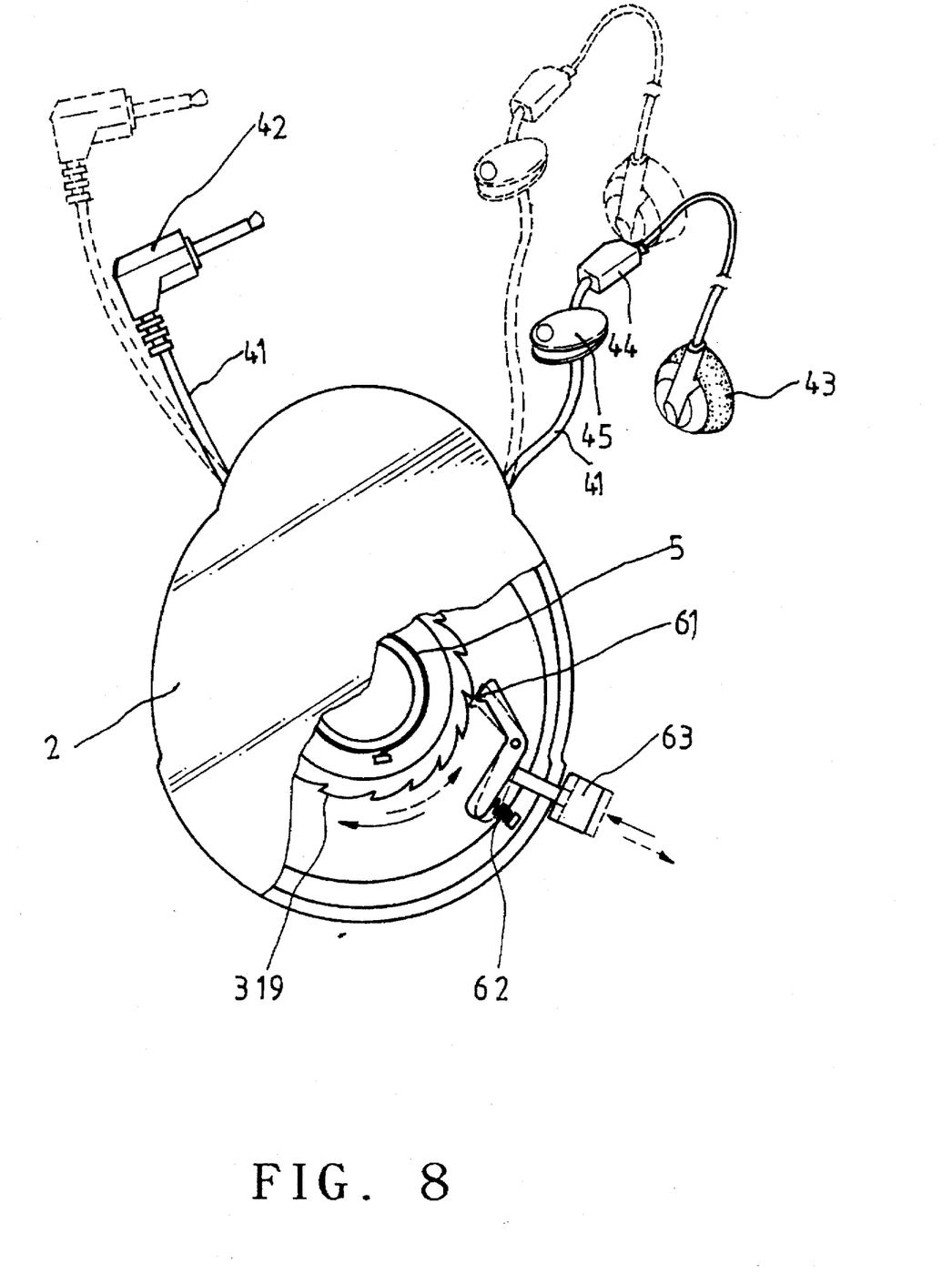
FIG. 8 shows the operation of the embodiment of FIG. 6.

FIG. 6 shows another embodiment of the present invention, wherein a ratchet ring 319 is additionally disposed around the annular rib 318. A leaf spring 5 is disposed between the annular rib 318 and the ratchet ring 319. One end 51 of the leaf spring 5 is fixed on the lower reel 31, while the other end 52 thereof is fixed on the housing 2. Referring to FIG. 7, when it is desired to pull out the earphone/microphone wire 4, the wire bodies 41 of the earphone and plug will force the assembly of the upper reel 32 and lower reel 31 to rotate. At this time, the ratchet ring 319 is engaged with an engaging hook 61 of a detent set 6, which is forced to engage with the ratchet ring 319 by the resilient force of a spring 62, whereby the reel assembly can be only rotated in one direction in accordance with the pulling operation of the wire bodies 41. Also, during the winding operation, the leaf spring 5 is tightened inward. When it is desired to wind in the wire after communication, a depression button 63 in a button hole 25 of the housing is depressed inward, forcing the engaging hook 61 to disengage from the ratchet ring 319. At this time, the leaf spring 5 is no more restricted by external force and is resiliently restored, whereby the reel assembly is reversely rotated to wind in the wire bodies 41 as shown in FIG. 8.

Figure 9:
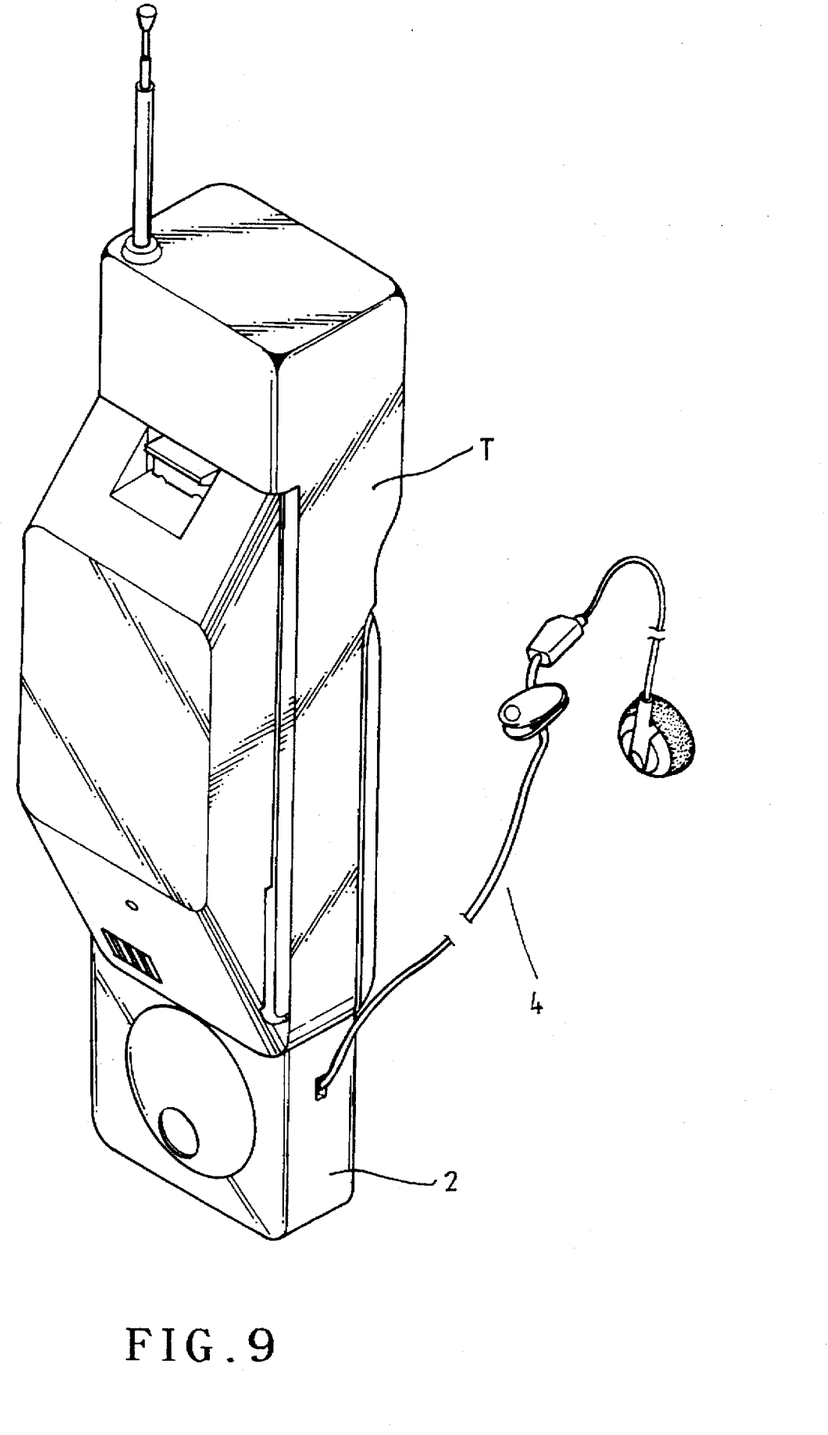
FIG. 9 shows the application of the present invention to a mobile phone.

Referring to FIG. 9, the shape of the housing 2 can be changed in accordance with the mobile phone T so as to facilitate the holdfree operation and carriage thereof. However, the internal structure of the housing is kept unchanged. The housing 2 is attached to a back face of the mobile phone T.

Figure 10:
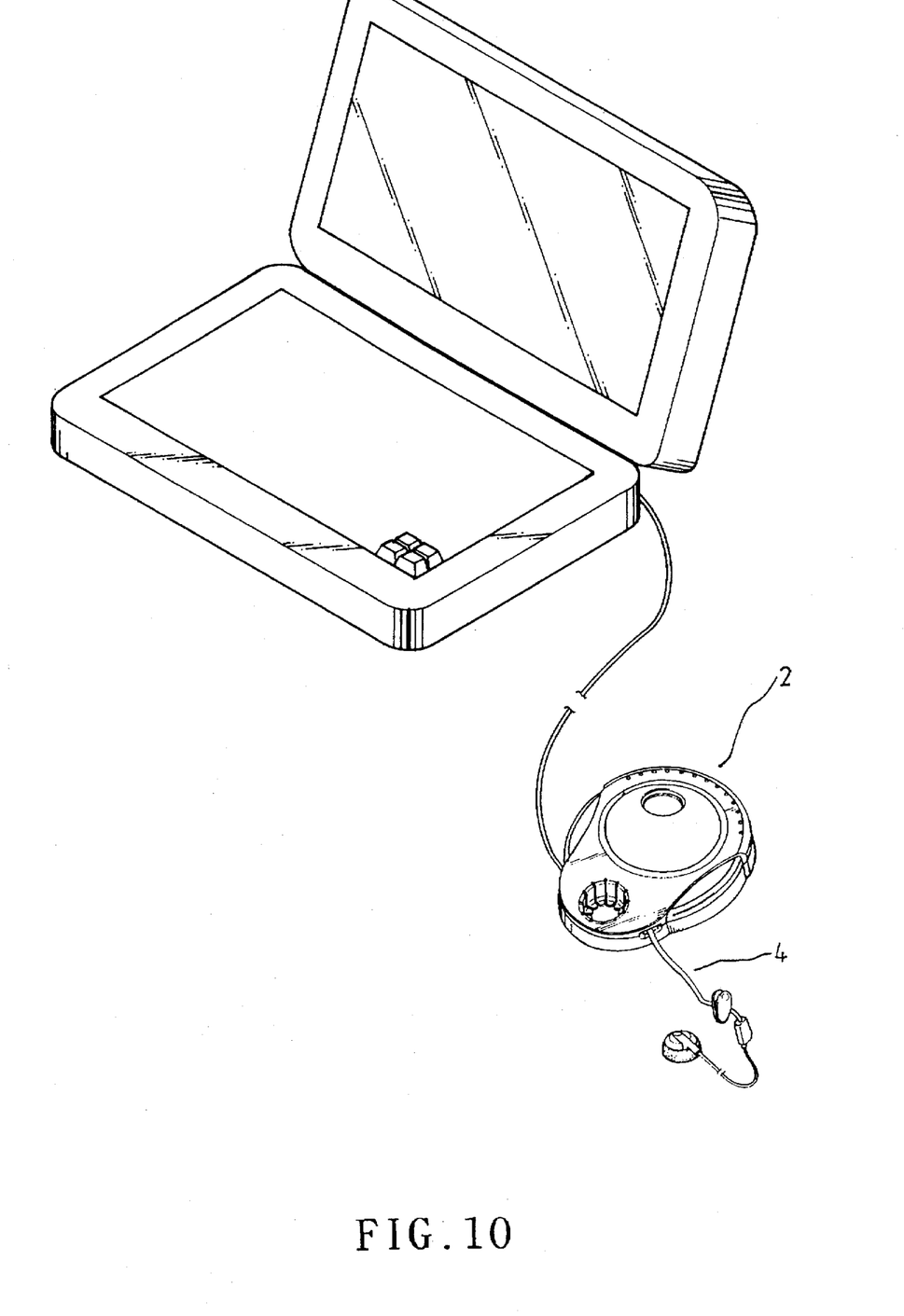
FIG. 10 shows the application of the present invention to a portable computer.

As shown in FIG. 10, the present invention is also applicable to a portable computer. In addition to the winding set 3, the housing 2 can also receive other electrical appliance such as holdfree hand set device, charging device or answer machine.

Many modifications of the above embodiments can be made without departing from the spirit of the present invention. The scope of the present invention should be defined only by the appended claims.

What is claimed is:

1. A device for receiving earphone/microphone wire of holdfree hand set, comprising a housing, a winding set and an earphone/microphone wire, wherein:

the winding set is received in the housing, a top face of the housing being formed with a circular hole, an edge of the housing being disposed with a plug lead hole and an earphone lead hole;

the winding set includes a lower reel and an upper reel, the lower reel being composed of an upper and a lower disks, a top face of the upper disk being disposed with an annular rib, a bottom of the upper reel being disposed with several radial ribs, an inner end of each radial ribs being formed with a recess, wherein the annular rib of the upper disk is fitted into the recesses of the radial ribs so as to assemble the upper reel with the lower reel and define a clearance therebetween for winding and storing the earphone/microphone wire therein, a cut channel extending from a point of the annular rib through the center of the upper disk to the periphery thereof, the upper disk being formed with a central hollow shaft, the upper and lower disks defining a clearance therebetween for winding and receiving the earphone/microphone wire therein; and the earphone/microphone wire includes a wire body received in the winding set, two ends of the wire body being respectively conducted out from the earphone lead hole and plug lead hole, one end of the wire body being disposed with a plug, while the other end thereof being disposed with an earphone/microphone.

2. A device as claimed in claim 1, wherein a ratchet ring is additionally disposed around the annular rib of the lower reel, a leaf spring being disposed between the annular rib and the ratchet ring for automatically winding the wire body.

3. A device as claimed in claim 1, wherein the shape of the housing is changeable in accordance with a mobile phone for facilitating the holdfree operation and carriage thereof.

4. A device as claimed in claim 1, wherein the housing also receives peripheral appliances which includes a holdfree hand set device, a charging device and an answer machine.

5. A device as claimed in claim 1, wherein the plug is configured to be plugable into a socket of a portable computer.

\* \* \* \* \*